US011611083B2

(12) United States Patent
Montoya et al.

(10) Patent No.: US 11,611,083 B2
(45) Date of Patent: Mar. 21, 2023

(54) DYNAMIC PIEZOCATALYST SYSTEM

(71) Applicant: Toyota Research Institute, Inc., Los Altos, CA (US)

(72) Inventors: Joseph Harold Montoya, Berkeley, CA (US); Muratahan Aykol, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 222 days.

(21) Appl. No.: 16/742,383

(22) Filed: Jan. 14, 2020

(65) Prior Publication Data
US 2021/0218034 A1      Jul. 15, 2021

(51) Int. Cl.
*H01M 4/86*      (2006.01)
*H01M 4/94*      (2006.01)
*H01M 4/92*      (2006.01)

(52) U.S. Cl.
CPC ......... *H01M 4/8626* (2013.01); *H01M 4/925* (2013.01); *H01M 4/94* (2013.01)

(58) Field of Classification Search
None
See application file for complete search history.

(56) References Cited

U.S. PATENT DOCUMENTS

| 8,454,817 B2 * | 6/2013 | Xu ........................... B01J 19/10 205/637 |
| 2016/0111564 A1 * | 4/2016 | Gidwani ............. H01M 4/8605 429/434 |
| 2017/0077522 A1 | 3/2017 | Eres et al. | |

FOREIGN PATENT DOCUMENTS

WO       2011008275 A2      1/2011

OTHER PUBLICATIONS

Ding, H. et al., "Computational Approach for Epitaxial Polymorph Stabilization through Substrate Selection," ACS Applied Materials and Interfaces, 2016, 8, pp. 13086-13093.
(Continued)

*Primary Examiner* — Daniel S Gatewood
(74) *Attorney, Agent, or Firm* — Christopher G. Darrow; Darrow Mustafa PC

(57) ABSTRACT

Methods are provided for tailoring multi-step chemical reactions having competing elementary steps using a strained catalyst. In various aspects, a layered piezo-catalytic system is provided, and may include a metal catalyst overlayer disposed on a piezo-electric substrate. The methods include applying a voltage bias to the piezo-electric substrate of the piezo-catalytic system resulting in a strained catalyst having an altered catalytic activity as a result of one or both of a compressive stress and tensile stress. The methods include exposing reagents for at least one step of the multi-step chemical reaction to the strained catalyst, and catalyzing the at least one step of the multi-step chemical reaction. In various aspects, the methods may include using an oscillating voltage bias applied to the piezo-electric substrate.

9 Claims, 4 Drawing Sheets

(56) References Cited

OTHER PUBLICATIONS

Figure 1:
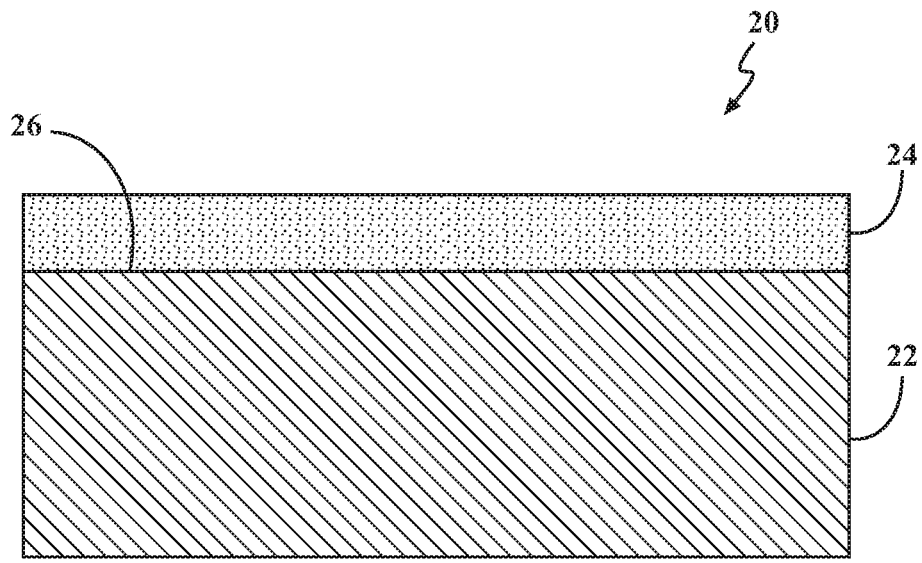

Stacey, K., "New theory shows how strain makes for better catalysts," Brown University (Apr. 20, 2018) (3 pages).
Khorshidi, A. et al., "How strain can break the scaling relations of catalysis," Nature Catalysis, vol. 1, pp. 263-268 (Apr. 2018).
Kulkarni, A., et al. "Understanding Catalytic Activity Trends in the Oxygen Reduction Reaction," Chem Rev., Mar. 14, 2018; 118(5), pp. 2302-2312.
Wang, H., et al., "Direct and continuous strain control of catalysts with tunable battery electrode materials," Science, Nov. 25, 2016; 354(6315):1031-1036 (12 pages).

* cited by examiner

DYNAMIC PIEZOCATALYST SYSTEM

TECHNICAL FIELD

The present disclosure generally relates to increasing catalytic activity and, more particularly, to providing a catalyst-piezoelectric substrate interface for dynamic manipulation of catalytic activity for a given reaction.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Fuel cell vehicles, such as those that use polymer electrolyte membrane fuel cells (PEMFCs), represent a promising option for future mobility because they afford high energy efficiency and include a zero emission powertrain platform. While the PEMFC technology has been commercialized for decades, it still faces challenges of high material cost and certain performance gaps. For example, the oxygen reduction reaction (ORR) that occurs at the cathode of PEMFCs has relatively slow chemical kinetics, thus posing a potential obstacle to increasing cell performance. One key function of a catalyst is to alter the rate and selectivity of a reaction pathway. Even with a platinum catalyst, such cells can suffer from significant overpotential loss and poor durability. Although greater amounts of catalyst can be used in order to overcome performance issues, this substantially increases cost.

It is generally known that material parameters may affect the activity of a catalyst. For example, catalysts can be manipulated or engineered to have an optimal absorption energy for a particular turnover frequency. In various aspects, strain applied to a catalyst, both tensile stress and compressive stress, may increase or decrease a given reaction rate. For example, a catalyst under a tensile strain may bind a reagent weakly, while a catalyst under compressive strain may bind a reagent strongly, and vice-versa. It may be desired to have a combination of relatively weak or strong binding at different times throughout a series of reactions; however, the strain applied to a catalyst during a given reaction cannot currently be manipulated.

Accordingly, it would be desirable to provide improved control of catalyst activity, including specific control of the strength of binding to a reagent, in order to improve targeted synthesis conditions.

SUMMARY

This section provides a general summary of the disclosure, and is not a comprehensive disclosure of its full scope or all of its features.

In various aspects, the present teachings provide a method for tailoring a multi-step chemical reaction having competing elementary steps. The method includes providing a layered piezo-catalytic system, and applying a voltage bias to the piezo-catalytic system. The application of the voltage bias results in a strained metal catalyst having an altered catalytic activity. The strain may be a compressive stress or a tensile stress, depending on the metal catalyst and amount of voltage bias. The method includes exposing reagents for at least one step of the multi-step chemical reaction to the strained metal catalyst, and catalyzing the at least one step of the multi-step chemical reaction.

In other aspects, the present teachings provide a method for tailoring an aqueous electrocatalysis reaction. The method includes providing a layered piezo-catalytic system that may include a metal catalyst overlayer disposed on a piezo-electric substrate. The method then includes applying a voltage bias to the piezo-electric substrate, resulting in a strained catalyst having an altered catalytic activity. The strain may be a compressive stress or a tensile stress, depending on the metal catalyst and amount of voltage bias. The method includes exposing reagents for the aqueous electrocatalysis reaction to the strained catalyst; and catalyzing at least one step of the aqueous electrocatalysis reaction.

In still other aspects, the present teachings provide a work hardened metal catalyst including a substrate having a first region and a second region. A first metal may be disposed on a surface of the first region of the substrate, and a second metal may be disposed on a surface of the second region of the substrate. One of the first metal and the second metal includes a work hardened metal that has been subjected to at least one strain force resulting in active sites created therein. The active sites have a unique reactivity relative to the other one of the first metal and the second metal with an unstrained metal disposed on the respective region of the substrate.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1 is a schematic illustration of an exemplary piezo-catalytic system that includes a piezo-electric substrate with at least one metal catalyst overlayer disposed on a piezo-electric substrate according to the teachings of the present technology;

FIG. 2 is a schematic illustration of an exemplary piezo-catalytic system that includes two regions, each with a piezo-electric substrate with at least one metal catalyst overlayer disposed on a piezo-electric substrate;

FIG. 3 illustrates a kinetic "volcano", based on micro-kinetic modeling, and provides data adapted from the American Chemical Society;

FIG. 4 provides an illustration of the "volcano" with the limiting potential as a function of the change in $\Delta G_{OH}$;

FIGS. 5 and 6 provide an illustration of the improvement in overpotential for $Pt_3Y$ and $Pt_3Ni$, respectively, using strained metal catalysts; and FIG. 7 is a schematic illustration of a $Pt_3Y$ or $Pt_3Ni$ metal catalyst disposed over a $PbZrO_3$—$PbTiO_3$ (PZT) piezo-electric substrate.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to a controlled manipulation of catalyst activity, and thus provides methods for tailoring a multi-step chemical reaction having competing elementary steps. In particular, the present technology provides a piezo-catalytic system to manipulate a strain applied to a metal catalyst. The strain may be applied as one of a tensile stress, a compressive stress, and a combination of different stresses applied at different times. For example, the strain may be applied prior to, or during, a given reaction or step of o multi-step reaction. Generally, the piezo-catalytic system may be a layered system that includes at least one metal catalyst overlayer that is disposed on a surface of a piezo-electric substrate. A voltage bias applied to the piezo-electric substrate of the piezo-catalytic system is transferred to the metal catalyst overlayer. As a result, a compressive or tensile strain is applied to the metal catalyst for dynamic manipulation of catalytic activity for the given reaction or step.

As is generally known in the art, a metal catalyst adsorbs reactants—it causes reactants to bind to its surface so that a reaction can take place. The adsorption may break chemical bonds of the molecules such that various steps of a chemical reaction can occur on a surface of the metal. After the particular step of the reaction has completed, the resulting product is then desorbed from the catalyst. The activity of a catalyst is based, in part, on how tightly the catalyst binds the respective molecules. While an increased binding strength is desirable for enabling the chemical reaction, such an increased binding strength may interfere with the subsequent desorption step. Heterogeneous catalysts control rates of chemical reactions by changing energy levels of bound intermediates relative to one another. Generally, an increase in a catalyst reactivity for one chemical also increases the reactivity for other chemicals. Similarly, a decrease in reactivity for one chemical decreases the reactivity for other chemicals. In the example of an oxygen evolution reaction, however, an optimal catalyst needs to bind OOH* strongly, and bind OH* weakly. Thus, there may be various scaling relations that problematically provide good reactivity/binding for certain chemicals, yet inhibit reactivity/binding for other chemicals or other steps of a multi-step reaction. The present technology addresses this constraint with a variable applied strain to tailor catalytic activity.

Different externally applied strains can affect a metal catalyst's activity in different ways. A tension stress generally stretches the atomic lattice of the metal catalyst, thereby making the metal catalyst more reactive to molecules that naturally want to push the lattice apart, and less reactive to molecules that naturally want to pull the lattice together. For example, when metal is put under tensile strain, the interatomic spacing of the surface atoms increases. A compressive stress generally pushes and compresses the lattice, thereby making the metal catalyst less reactive to molecules that naturally want to push the lattice apart, and more reactive to molecules that naturally want to pull the lattice together. With applied strains, the metal catalyst may be able to simultaneously bind one chemical more tightly, and another more loosely, depending on the chemical's interaction with the atomic lattice and the manner in which the strain field is engineered on the catalyst surface. As such, the scaling relations of the past may now be offset by engineering the catalyst with a surface that can relatively easily be modified based on the desired activity needed for a reaction step or sequence of steps in a multi-step reaction.

In order to offer a reasonable probability of achieving new forms of catalytic activity with the present technology, a piezo-catalytic system should be chosen to be easily synthesizable, for example, to be able to be made in a layered manner with a metal catalyst overlayer disposed on a piezo-electric substrate. FIG. 1 is a simplified schematic illustration of an exemplary piezo-catalytic system 20 that includes a piezo-electric substrate 22 with at least one metal catalyst overlayer 24 disposed on a piezo-electric substrate and in electrical contact therewith. Although shown with one substrate material and one metal catalyst overlayer, a combination of substrates and/or a combination of metal catalyst layers can be used. The assembled piezo-catalytic system 20 may then be used to facilitate a particular reaction step from a multi-step chemical reaction having competing elementary steps. In various aspects, methods of the present technology may include providing a layered piezo-electric substrate 22 having at least one metal catalyst overlayer 24 and then either before, or even during the reaction, applying a voltage bias to the piezo-electric substrate 22 for a predetermined period of time, resulting in a strained metal catalyst. In various aspects, the voltage bias may range between about −2 V to about 2 V, and the applied voltage necessary to achieve the strain may vary depending on the film thickness. In various aspects, the strength of the material can range +/−2,000 V/mm, based on the bias and thickness configuration used with the piezo-electric substrate material. The voltage may result in either a compressive or tensile strain applied to the metal catalyst 24 disposed on the substrate 22. This resulting strain may increase or decrease the catalytic activity of the piezo-catalytic system. Reagents of the given reaction, or step thereof, are then exposed to the strained metal catalyst, with the methods including catalyzing at least one step of a multi-step chemical reaction. In various aspects, the methods may include providing a first voltage bias to the piezo-electric substrate for a first predetermined period of time, and providing a second voltage bias to the piezo-electric substrate for a second predetermined period of time. The applied voltage and predetermined times may vary based on the desired catalytic activity.

In other aspects, the applied voltage bias may be oscillated such that the piezo-electric substrate material is both expanded and compressed during the reaction. Ranges and parameters of voltage bias for the oscillation, as well as other field parameters, may depend on the specific reaction(s). In various aspects, the exemplary maximum frequency should be based on the particular piezo-electric substrate material, and can be from about 60 MHz to about 70 MHz. Providing the oscillating voltage bias to the piezo-electric substrate results in the strained catalyst changing from being exposed to alternating compressive and tensile stresses. When the frequency of oscillation of the voltage bias is higher than the given reaction rate, both compressive and tensile strain may be applied to the metal catalyst during the reaction. This may allow the catalyst to operate in multiple different modes. For example, resulting in binding the reagents both strongly and weakly at different times over the course of the reaction or particular step. This allows for not only a controlled manipulation of the activity of the metal catalyst for a given reaction, but the manipulation of the activity of the metal catalyst during each particular step or stage of the given reaction. As a result, the efficiency of a given metal catalyst may be maximized for the reaction.

Figure 2:
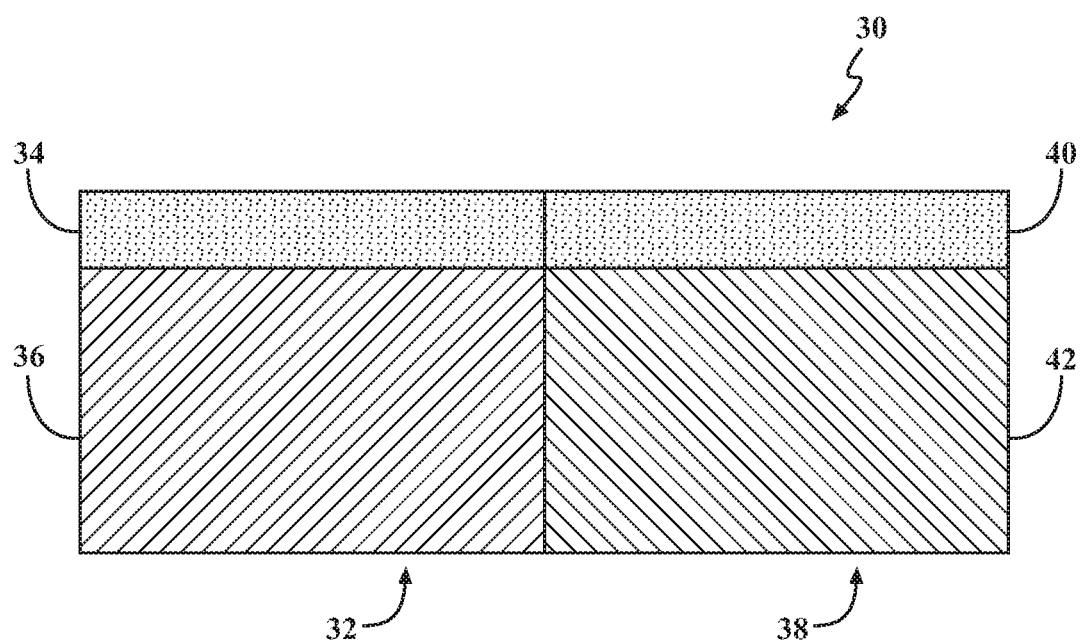

FIG. 2 is a schematic illustration of another exemplary piezo-catalytic system 30 that includes a first region 32 with a first metal catalyst overlayer 34 disposed on a first piezo-electric substrate 36 and in electrical contact therewith, and a second region 38 with a second metal catalyst 40 disposed over a second piezo-electric substrate 42 and in electrical contact therewith. Additional regions may also be provided as desired. Different regions may be provided with different metal catalysts and/or different substrate materials. An applied voltage bias can then be applied to different regions at different times and at different voltages in order to customize the catalytic activity.

While FIGS. 1-2 generally depict the piezo-electric substrates 22, 36, 42 in direct contact with the respective metal catalyst layers 24, 34, 40 there may be situations where it is desirable to optionally include an electrically conductive material or an electrically insulating material at an interface 26, or portion thereof, between the piezo-electric substrate 22, 36, 42 and the respective metal catalyst layer 24, 34, 40. Such an electrically conductive material or an electrically insulating material may be provided to influence the amount of voltage transferred between the components, which may allow for further manipulation of the amount of strain that is subsequently applied to the catalyst. In various aspects with respect to the arrangement of FIG. 2, the step of applying the voltage bias to the piezo-electric substrate may include providing a first voltage bias to the first piezo-electric substrate 36 for a first predetermined period of time, and providing a second voltage bias to the second piezo-electric substrate 42 for a second predetermined period of time. The second voltage bias may be the same or different from the first voltage bias.

The selection of materials for use with the piezo-catalytic system may vary widely depending upon the specific reaction that is intended for manipulation. In various aspects, the present technology is intended for any type of multi-step chemical reaction that takes place with a series of reactions, where there are competing elementary steps involved. Accordingly, the selection of materials should generally be made such that the catalytic activity migrates from a first regime of rate-limitation for a given reaction to second regime of rate-limitation. Thus, catalysts and piezo-electric substrates may be selected and paired together based upon the dynamics of the given reaction and the compatibility of the catalyst with the particular piezo-electric substrate.

Non-limiting examples of the various multi-step chemical reactions useful with the strained metal catalysts of the present technology broadly include reactions pertaining to aqueous electrocatalysis, with various metal catalysts. As referred to herein, aqueous electrocatalysis generally relates to aqueous electrochemical reactions that take place with a catalyst that generally functions at electrode surfaces. During electrocatalysis, numerous half-reactions involving multiple steps, multiple electron transfers, and the evolution or consumption of gases/fuels in their overall chemical transformations can have considerable kinetic barriers. In various aspects, the present technology works well for manipulating aqueous electrocatalysis reactions, and more specifically, the various reactions that are involved with the function of fuel cells that may be used with vehicles. The present technology provides tailoring of the electrocatalyst activation energy to provide enhanced rates of reaction for oxygen reduction reaction (ORR), oxygen evolution reaction (OER), hydrogen evolution reaction (HER), and electrochemical direct carbon dioxide reduction reaction ($CO_2RR$).

ORR catalytic activity has been studied for many years, however improvements in ORR performance of materials has not necessarily increased as hoped in terms of intrinsic activity improvements. While the present technology is not limited to ORR mechanisms, ORR mechanisms are provided below as an example of a multi-step chemical reaction. Oxygen is a large thermodynamic driving force of ORR, and there are two reduction reactions that take place. With reference to equations below, oxygen can be reduced to water by a direct, four electron pathway (Equations 1 and 3), or can be reduced to peroxide by a two electron pathway (Equations 2 and 4)

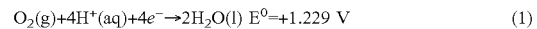
$$O_2(g)+4H^+(aq)+4e^-\rightarrow 2H_2O(l) \; E^0=+1.229 \text{ V} \quad (1)$$

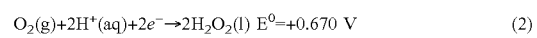
$$O_2(g)+2H^+(aq)+2e^-\rightarrow 2H_2O_2(l) \; E^0=+0.670 \text{ V} \quad (2)$$

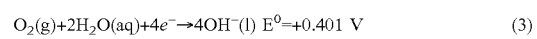
$$O_2(g)+2H_2O(aq)+4e^-\rightarrow 4OH^-(l) \; E^0=+0.401 \text{ V} \quad (3)$$

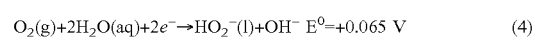
$$O_2(g)+2H_2O(aq)+2e^-\rightarrow HO_2^-(l)+OH^- \; E^0=+0.065 \text{ V} \quad (4)$$

The four electron pathways are more desirable because the unstable peroxides can further be reduced in water when in an acidic medium as provided in Equation 5, or decompose by a disproportionation as provided in Equation 6. Equation 7 provides a reduction of peroxide in alkaline media, while Equation 8 provides the decomposition.

$$H_2O_2(aq)+2H^+(ag)+2e^-\rightarrow 2H_2O(l) \; E^0=+1.77 \text{ V} \quad (5)$$

$$2H_2O_2(aq)\rightarrow 2H_2O(l)+O_2(g) \quad (6)$$

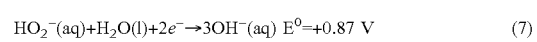
$$HO_2^-(aq)+H_2O(l)+2e^-\rightarrow 3OH^-(aq) \; E^0=+0.87 \text{ V} \quad (7)$$

$$HO_2^-(aq)\rightarrow 2OH^-(aq)+O_2(g) \quad (8)$$

Catalyzed ORR is a multi-step reaction that can be illustrated in the following reaction sequence of Equation 9, with * indicating sites on a catalytic surface:

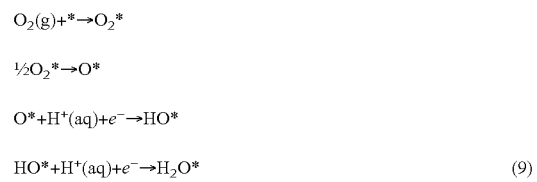
$$O_2(g)+*\rightarrow O_2*$$
$$\tfrac{1}{2}O_2*\rightarrow O*$$
$$O*+H^+(aq)+e^-\rightarrow HO*$$
$$HO*+H^+(aq)+e^-\rightarrow H_2O* \quad (9)$$

Figure 3:
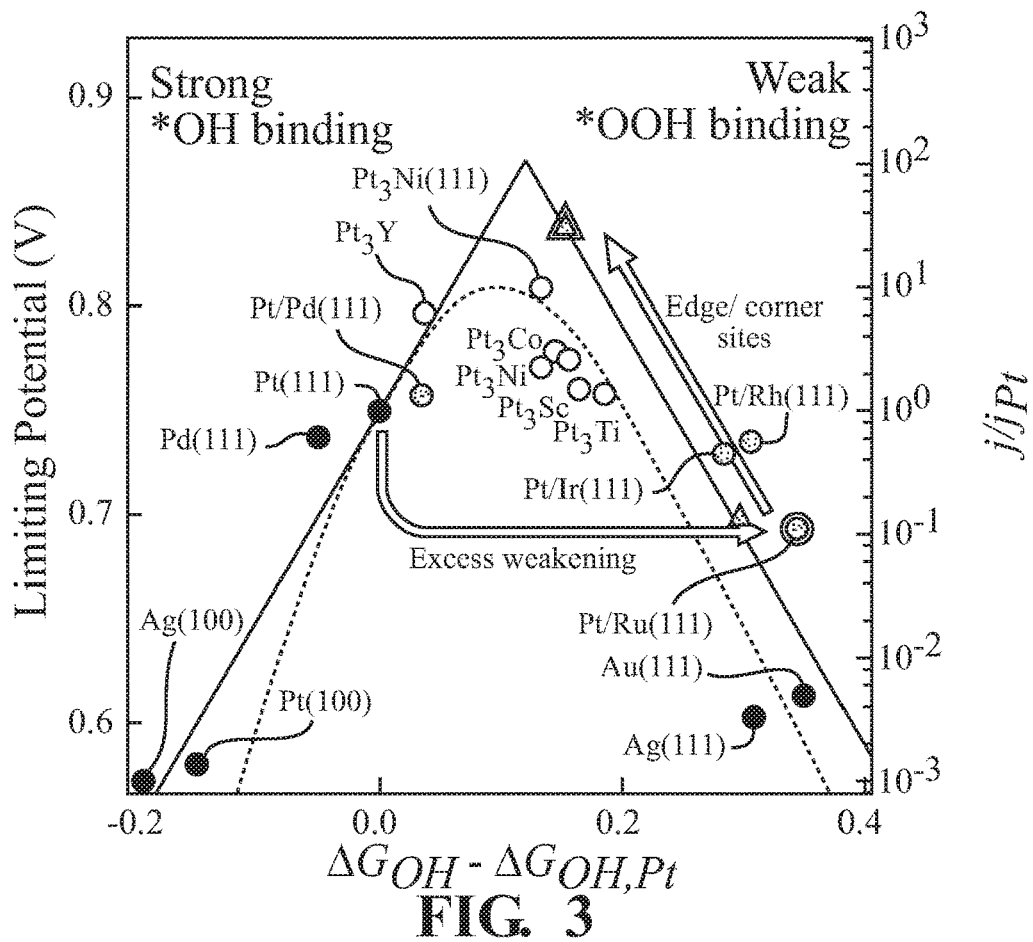

In addition to a piezo-catalytic system that is chosen to be synthesizable and made in a layered manner, the systems of the preset technology should be made in such a manner as to have their catalytic activity migrate from one regime of rate-limitation to another. FIG. 3 illustrates what is referred to as a kinetic "volcano", based on micro-kinetic modeling, and provides data adapted from the American Chemical Society, as published in "Understanding Catalytic Activity Trends in the Oxygen Reduction Reaction", Nørskov et al. Chem. Rev. (2018). Catalyst candidates are often chosen as to have the possibility of traversing the activity model peak with applied tensile and compressive strain, which includes most know catalysts near the peak. As such, FIG. 3 provides viable candidates for use in the metal catalyst overlayer with the methods of the present technology that target catalysts for ORR. In various aspects, the metal catalyst overlay may include a catalytic metal selected as a substantially pure metal near the peak of the predicted activity model of FIG. 3, such as a metal from the group of platinum (Pt), palladium (Pd), gold (Au), silver (Ag), and iridium (Ir). The surface of an electrocatalyst may influence and determine certain properties of a given reaction. For example, the rate and product selectivity activity of an electrocatalyst can be tuned with a chemical modification, which can also be obtained by alloying two or more metals. Thus, in various aspects, platinum group metal (PGM) alloys and nanoalloys may be used, including for example, alloys of platinum with early transition metals such as platinum-cobalt ($Pt_2Co$), platinum-nickel (Pt$_3$Ni), platinum-scandium (Pt$_3$Sc), platinum yttrium (Pt$_3$Y), and platinum/ruthenium (Pt/Ru).

For the hydrogen evolution reaction (HER), the above metals may be used as metal catalysts in the overlayer, in addition to molybdenum disulfide (MoS$_2$), molybdenum phosphosulfide (MoPIS), cobalt phosphide (CoP), cobalt phosphosulfide (CoPS), and nickel molybdenum (NiMo).

In some implementations, the particles of catalytic metal will be provided in at least one overlayer having a specific surface area of at least 10 m$^2$/g, or 20 m$^2$/g, or 30 m$^2$/g, or 40 m$^2$/g, or 50 m$^2$/g, or 60 m$^2$/g, or 70 m$^2$/g, or 80 m$^2$/g, or 90 m$^2$/g, or 100 m$^2$/g. In some implementations, the particles of a catalytic metal will be nanoparticles having an average maximum dimension of less than 100 nm, or less than 90 nm, or less than 80 nm, or less than 70 nm, or less than 60 nm, or less than 50 nm, or less than 40 nm, or less than 30 nm, or less than 20 nm, or less than 10 nm. In some specific implementations, the catalyst composition will include platinum nanoparticles having an average maximum dimension of from about 2 nm to about 5 nm, while in certain aspects, the metal catalyst overlayer is provided having a thickness of from about 5 nm to about 10 nm. In some implementations, the particles of a catalytic metal may include porous particles.

Candidate materials for the piezo-electric substrate that are useful with the present technology should be selected so as to have an effective maximum interfacial surface area with the metal catalyst overlayer(s), and to have the appropriate piezo-electric properties necessary to apply the strain to the metal catalyst overlayer. Usually, an epitaxial substrate is manually selected from a pool of common candidates optionally using visualization software. In various aspects, it may be possible to use a well-established "substrate matching" tool, such as that provided in H. Ding et al., "Computational Approach for Epitaxial Polymorph Stabilization through Substrate Selection" ACS Appl. Mater. Interfaces, 8, 20 (2016), in order to obtain an appropriate piezo-electric substrate that is suitable for a certain metal catalyst overlayer. In various aspects, the piezo-electric substrate may be selected from the group of inorganic compounds including barium titanate (BaTiO$_3$), lanthanum tantalate (LaTaO$_3$), strontium titanate (SrTiO$_3$), silicon dioxide (SiO$_2$), lithium tantalate ((LiTaO$_3$), and other perovskites. In certain aspects, other piezo-electric materials may be suitable with appropriate nanostructuring, such as lead zirconate (PbZrO$_3$), lead titanate (PbTiO$_3$), aluminum nitride (AlN), potassium niobate (KNbO$_3$), and other perovskite ferroelectric crystals.

In addition to aqueous electrocatalysis, the present technology may also be useful for enhancing chemical reactions for various other systems that have well-known "volcano" relationships, for example, that have rate limitations resulting from competing elementary steps. As non-limiting examples, the present technology may also be useful with steam reforming of methane (with platinum group alloy catalysts), CO oxidation (with platinum group or Au catalysts), NO oxidation (with platinum group alloy catalysts), ammonia synthesis (with Os, Ru, Fe/K+ catalysts), and acetylene hydrogenation (with Pd—Ag, Pd—Au, and Pd catalysts).

Example of a Combined System, and Improvements in Overpotential

Figure 4:
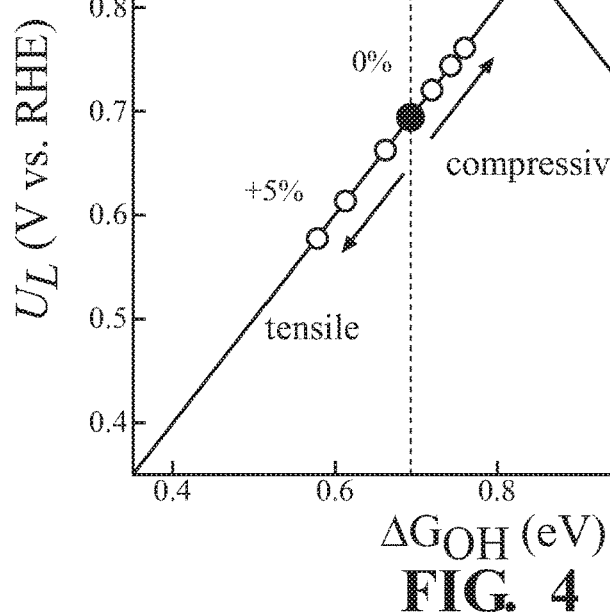

FIG. 4 provides an illustration of the limiting potential "volcano" as a function of the change in $\Delta G_{OH}$. As can be seen, the U$_L$ improved with increasing compressive strain. The intermediate strains are ±2 and ±4%. A strain of about 5% induces a ~0.1 eV shift in the OH* binding energy of a given adsorbate. The ORR activity based on U$_L$ as a function of $\Delta G_{OH}$ (a descriptor for all reaction intermediates) is illustrated by the volcano relation, in which the theoretical maximum limiting potential U$_L$ occurs at about $\Delta G_{OH}$ 0.84 eV. On the left leg, the limiting step is final H$_2$O desorption with U$_L$=$\Delta G_{OH}$, whereas on the right leg, the limiting step is the initial OOH* adsorption. The peak arises from linear scaling between the binding strengths of OH* and OOH*, which prevents them from being modified independently.

Figure 5:
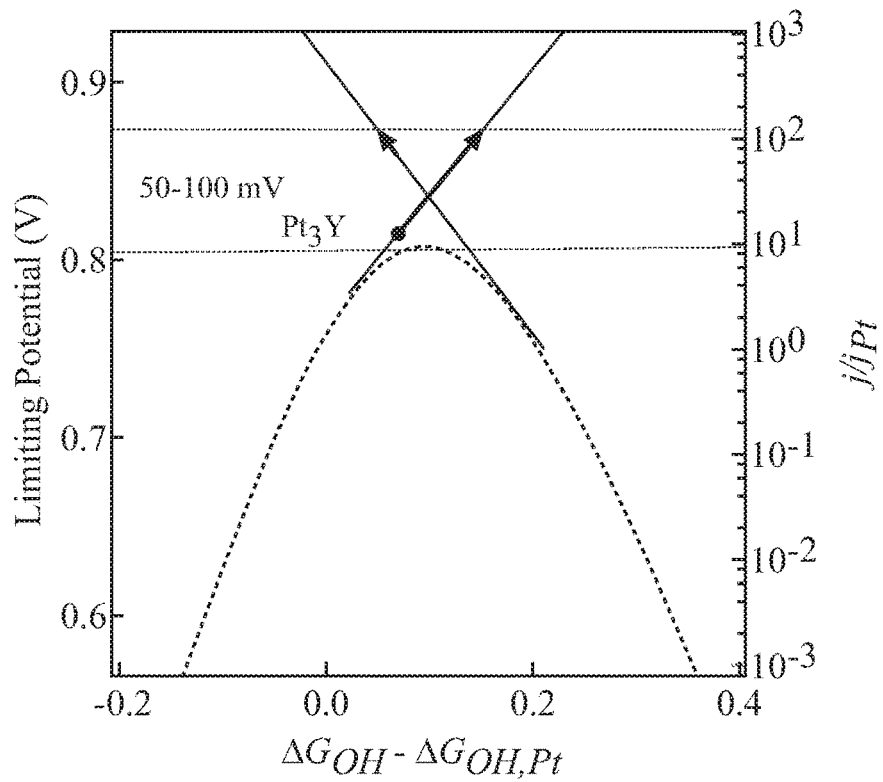
Figure 6:
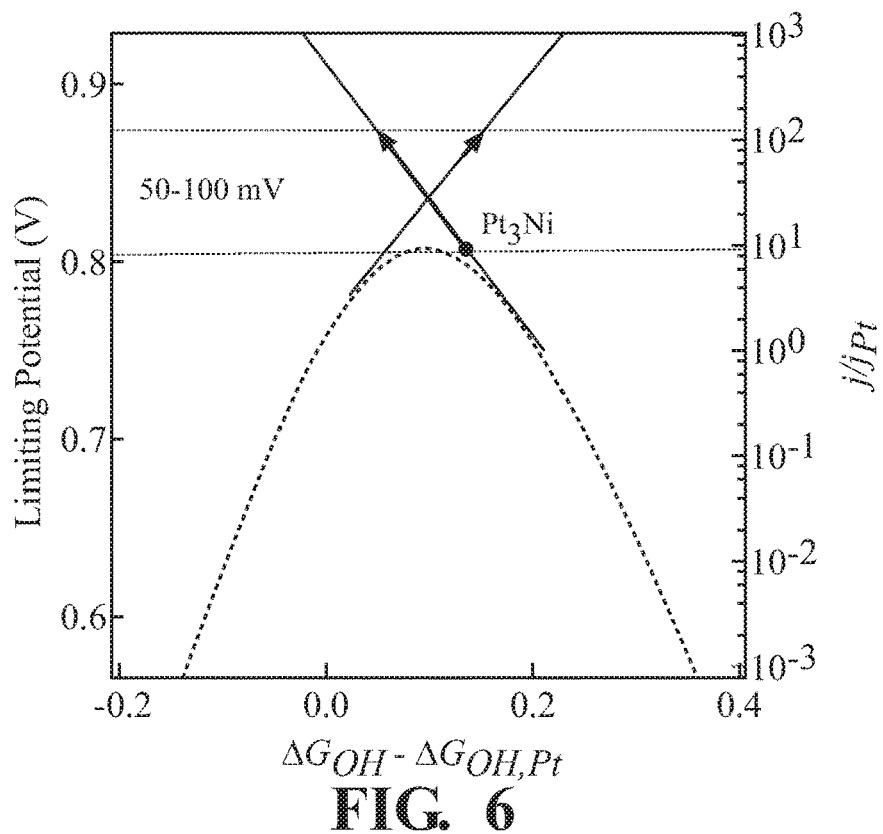

FIGS. 5-6 illustrate the improvement in overpotential for Pt$_3$Y and Pt$_3$Ni. Given the similarity in d-band profiles of Pt and Pt$_3$Ni, it can be assumed there is a similar perturbation in the OH* binding energy on Pt$_3$Ni and Pt$_3$Y. For Pt$_3$Ni, the improvement in overpotential is achieved via a large (5%) application of tensile strain (which decreases $\Delta G_{OH}$) and a small (~0.5%) application of compressive strain. For Pt$_3$Y, a similar effect is achieved via a large (5%) application of compressive strain (increasing $\Delta G_{OH}$) and a small (~0.5%) application of tensile strain. The compressive and tensile strain profiles necessary for the 50-100 mV improvement in ORR overpotential can be inferred from the reactivity metric $\Delta G_{OH}$ relative to the oxygen evolution volcano (represented by the curve in FIGS. 5-6). This overpotential reduction corresponds to a 1-2 order of magnitude improvement in the current density (j/j$_{Pt}$).

Figure 7:
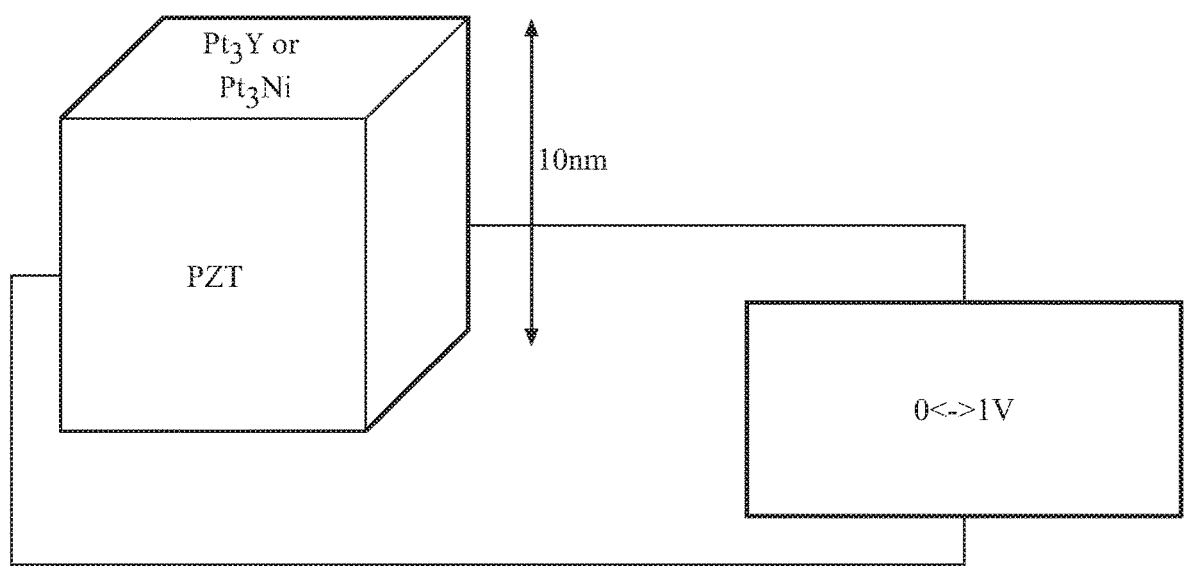

To illustrate how this couples to the piezoelectric substrate, one can compute the necessary voltage bias to produce the 5% strain required by the above examples for a common piezoelectric, PbZrO$_3$—PbTiO$_3$ (PZT). PZT has piezoelectric modulus, d$_{33}$, of approximately 500 pC/N. Therefore, for a substrate with thickness of 10-100 nm, one can achieve the 5% strain with 1-10 V of applied bias, as shown in FIG. 7. This voltage can be tuned by changing the thickness of the substrate, and the equation below governs the design of the system:

$$V=\text{strain}*\text{thickness}/\text{piezo-electric constant}=0.05*10 \text{ nm}/(500 \text{ pC/N})=1 \text{ V}$$

In addition to providing just a strained surface, in various aspects of the present technology, the metal catalyst may be provided with a work hardened surface such that the application of strain may result in the formation and disappearance of new active sites, which have unique reactivity relative to those of the equilibrium (unstrained) surface. Such a feature may be leveraged either in a dynamic manner as with the aforementioned system, in which the emergent sites allow for advantageous adsorption and/or dissociation in the reactivity state of the strain condition, and then disappear in the opposite state, allowing for two distinct reactivity modes of catalysis which can leverage their respective advantages in activity or selectivity. Separately, the work hardening may also be useful for the synthesis of defective structures generally, which have been shown to enhance e.g., CO$_2$RR at grain boundaries which form as the result of work hardening.

In various aspects, the present teachings provide a work hardened metal catalyst including a substrate having a first region and a second region. A first metal may be disposed on a surface of the first region of the substrate, and a second metal may be disposed on a surface of the second region of the substrate. One of the first metal and the second metal includes a work hardened metal that has been subjected to at least one strain force resulting in active sites created therein. The active sites have a unique reactivity relative to the other one of the first metal and the second metal with an unstrained metal disposed on the respective region of the substrate.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method for tailoring a multi-step chemical reaction having competing elementary steps, the method comprising:
   providing a layered piezo-catalytic system comprising a piezo-electric substrate and a metal catalyst overlayer disposed on the piezo-electric substrate;
   applying an oscillating voltage bias to the piezo-electric substrate and straining the metal catalyst overlayer such that the strained metal catalyst overlayer has an altered catalytic activity;
   exposing reagents for at least one step of the multi-step chemical reaction to the strained metal catalyst overlayer, wherein the multi-step chemical reaction comprises a reaction selected from the group consisting of: aqueous electrocatalysis, steam reforming of methane, CO oxidation, NO oxidation, ammonia synthesis, and acetylene hydrogenation; and
   catalyzing the at least one step of the multi-step chemical reaction.

2. The method for tailoring a multi-step chemical reaction having competing elementary steps according to claim 1, wherein the metal catalyst overlayer comprises a metal selected from the group consisting of: Pt, Pd, Au, Ag, Ir, Os, Ru, Fe/$K^+$, Pd—Ag, Pd—Au, platinum nanoalloys, and platinum group metal (PGM) alloys.

3. The method for tailoring a multi-step chemical reaction having competing elementary steps according to claim 1, wherein providing the oscillating voltage bias to the piezo-electric substrate results in the strained catalyst changing from being exposed to alternating compressive and tensile stresses.

4. The method for tailoring a multi-step chemical reaction having competing elementary steps according to claim 1, wherein the multi-step chemical reaction is the aqueous electrocatalysis.

5. The method for tailoring a multi-step chemical reaction having competing elementary steps according to claim 4, wherein the metal catalyst overlayer comprises a metal selected from the group consisting of: Pt, Pd, Au, Ag, and Ir.

6. The method for tailoring a multi-step chemical reaction having competing elementary steps according to claim 4, wherein the piezo-electric substrate comprises a material selected from the group consisting of: $PbZrO_3$, $PbTiO_3$, AlN, and $KNbO_3$.

7. The method for tailoring a multi-step chemical reaction having competing elementary steps according to claim 4, wherein the metal catalyst overlayer is provided having a thickness of from about 5 nm to about 10 nm.

8. The method for tailoring a multi-step chemical reaction having competing elementary steps according to claim 4, wherein the metal catalyst overlayer comprises a platinum alloy selected from the group consisting of: $Pt_2Co$, $Pt_3Ni$, $Pt_3Sc$, $Pt_3Y$, and Pt/Ru.

9. The method for tailoring a multi-step chemical reaction having competing elementary steps according to claim 8, wherein the platinum alloy comprises $Pt_3Ni$.

* * * * *